3,173,862
PROCESS FOR TREATING LIQUIDS
James S. Clements and Kenneth C. Laughlin, Charlotte, N.C., assignors to Celanese Corporation of America, New York, N.Y., a corporation of Delaware
Filed Dec. 14, 1960, Ser. No. 75,718
13 Claims. (Cl. 210—20)

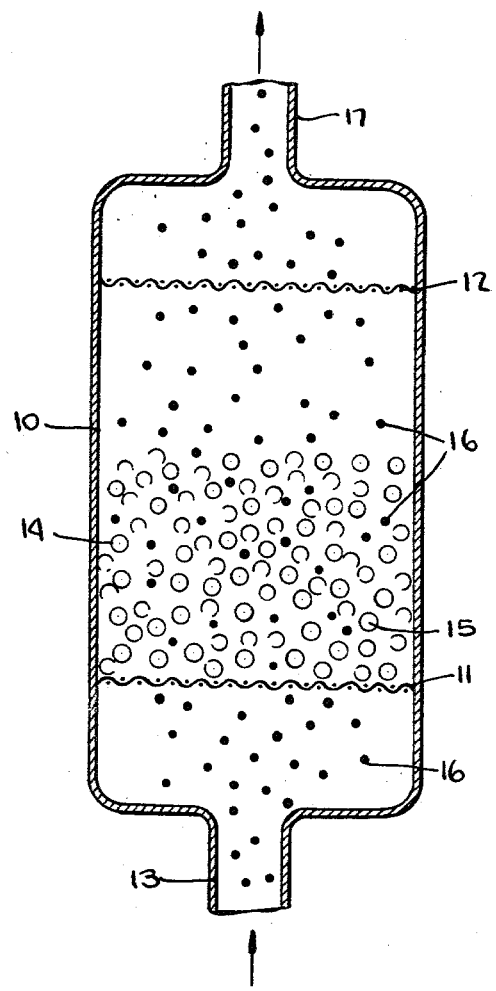

This invention relates to ion exchange reaction and more particularly to ion exchange reactions involving organic liquids containing solid matter.

While ion exchange may be effected by passing an organic liquid which is to be deionized through a bed of an ion exchange resin, where the organic liquid contains solid particles, serious difficulties arise. It has been found that the solid particles tend to settle in the resin bed coating the ion exchange resin thereby curtailing the resin available for contact with the liquid and with further use of the bed, filling in the spaces in the bed through which the liquid may pass to eventually clog the entire bed. Such coating and eventual clogging act to greatly diminish the effectiveness of the resin bed. Surprisingly, even when the spaces in the resin bed through which the liquid passes, e.g., spaces between resin particles, are larger than the solid particles contained in the liquid, the coating and possibly the eventual clogging still takes place. The avoidance of this difficulty involves at least the additional step of solid particle removal from the liquid prior to passage through the ion exchange bed. Further in many operations, it is undesirable to separate the solid particles from the liquid or at least to separate the solid particles prior to deionization of the liquid.

It is an object of this invention to provide a process for the deionization of a liquid containing solid particles.

It is another object of this invention to provide a process for the deionization of an organic liquid containing solid particles without separating the solid particles from the liquid.

It is a further object of this invention to provide process for passing an organic liquid containing solid particles through an ion exchange resin bed.

It is yet a further object of this invention to provide a process for deionizing spin baths used in processes for wet spinning of filaments.

Other objects and advantages of this invention will become apparent from the following detailed description and claims in which all proportions are by weight unless otherwise stated.

In accordance with one aspect of this invention it has been found that when an organic liquid containing solid particles is deionized by passing said liquid upwardly through a bed of ion exchange resin particles at a velocity sufficient to fluidize the resin bed, the tendency of solid particles to settle is diminished, clogging of the bed is eliminated and the effectiveness of the resin bed is greatly increased.

The resin particles should have greater terminal settling velocities than the solid particles in the liquid. Terminal settling velocity may be determined in accordance with Stokes' law. It is thus possible to select a velocity for the upward passage of the liquid through the resin bed which will be sufficient to fluidize said bed and carry the solid particles having a lower terminal settling velocity upward beyond the limits of said fluidized bed substantially without carrying along the less buoyant resin particles.

While the preferred proportions of solid particles which are permitted to pass through the bed will vary with the nature of the composition being deionized, in order to achieve desirable results with most compositions it is preferable that a major portion of the solid particles be permitted to pass through the resin bed and most preferable that at least 80% and quantities as high as 99% or more of said solid particles be permitted to pass. The amount of solid particles which is permitted to pass may be readily determined by determining the solids content of samples of the liquid before and after passage through the bed.

The process may be conveniently carried out in an elongated vertical chamber having an opening near the lower end and an opening near the upper end thereof. At a position intermediate said openings, an ion exchange resin bed is transversely disposed so as to cover the entire cross-section of the chamber. The resin bed is comprised of resin particles having a greater terminal settling velocity than the solid particles in the liquid to be deionized. The liquid containing solid particles is driven through the lower opening and the chamber at a velocity sufficient to fluidize the resin bed. However, the velocity must not be such that the resin particles are carried upward along with the solid particles through the upper opening. The fluidized resin bed will have a definable upper limit which will of course vary with the nature of the resin, the density of the resin particles as well as the upward velocity of the liquid. The upper opening through which the deionized liquid and solid particles pass out of the apparatus should be sufficiently above the upper limit of the fluidized bed so that substantially no resin particles are withdrawn through this upper opening.

While the upward velocity must be sufficient to fluidize the resin bed, it must not be so great that substantial portions of the resin are entrained over with the liquid. This will obviously result in dissipation of the resin bed as well as contamination of the deionized liquid.

Preferably the upward velocity is sufficient to provide a fluidized resin bed having a volume of from about 110 to 150% and most preferably from about 120 and 140% of the volume of the bed at rest.

While the fluidized bed has a definable upper limit, it is possible that some entrainment of resin particles for relatively short distances beyond the limits of the fluidized bed may occur. This entrainment may be due to irregularities in the uniformity of the liquid driving pressure or irregularities in the size of resin particles. It is preferable that the deionized liquid be withdrawn at a point sufficiently above the fluidized bed to be free of such stray resin particles.

In order to prevent the possible entrainment of resin particles with the deionized liquid, it is preferable to use above the fluidized resin bed means for confining the upward movement of resin particles. Such confining means are preferably size screening means e.g. a mesh screen. When employing such screening means in the process of this invention, the ion exchange resin particles used must be greater in size than the solid particles contained in the liquid. The screen should have openings which will permit the passage of the solid particles but not the passage of the resin particles. Besides preventing entrainment of resin particles, the screening means acts to prevent entrainment of substantial portions of the resin bed when upward liquid velocities are increased beyond desirable limits to become sufficiently great to overcome the terminal settling velocities of the resin particles. This may occur during the starting up of the process or when velocities are being adjusted.

It has been found that when using such upper screening means if the sustained upward velocity of the liquid becomes too great, enough resin particles are forced up to and maintained against the upper screen to substantially block the passage of solid particles through the resin bed. In such an undesirable condition, there is effected the same situation as when passing the liquid containing solid particles through a resin bed which is not fluidized. In other words, the resin bed maintained against the screen in effect becomes a non-fluidized resin bed with all attendant disadvantages of such a bed.

The process of this invention has been found to be particularly effective in deionizing spin baths employed in wet spinning of filament-forming materials, particularly in wet spinning of cellulose esters.

In wet spinning of filaments, it has been found that during the spinning operation a portion of the filament forming material will not form filaments but will form fines or suspended particles of somewhat lower average molecular weight than the filaments. It has been further found that such fines tend to deposit in the coagulation apparatus used in wet spinning. These fines are difficult to remove. However, it has been found that when the fine-containing spin bath has a relatively low conductivity, the tendency of fines or suspended particles to deposit out in coagulating apparatus and elsewhere in the spin bath is minimized. Accordingly, it has been found that a low conductivity in the spin bath may be advantageously maintained by removing spent spin bath, treating the spent spin bath with an ion exchange resin to eliminate ions present in the spin bath and recycling the deionized spin bath to the wet spinning process.

However, it was found that when the spent spin bath containing the fines was passed downwardly through conventional ion exchange resin beds, the fines coated out on the resin particles in the bed and otherwise settled in the bed so that soon the spaces in the bed became filled to the point that the spin bath passage therethrough was limited to a few channels and eventually the bed became completely clogged. Surprisingly, it was found that even where the nature of the resin bed was such that the spaces between the resin particles were large enough to permit the passage of the fines, the above coating out and eventual clogging occurred. It has been now found that by using the deionizing process of this invention, such spin bath containing suspended fines may be effectively deionized.

Among the spent spin baths containing suspended fines which may be deionized according to the process of this invention are spin baths used in spinning acetone-soluble secondary cellulose acetate as well as esters of cellulose with one or more organic or inorganic acids such as cellulose acetate-formate, cellulose acetate-propionate, cellulose propionate, cellulose acetate-propionate-butyrate, cellulose nitrate, and the like, the esters having varying degrees of substitution. The spin bath composition will of course depend on the identity of the filament-forming material.

Very advantageous results were obtained when using the process of this invention for deionizing spin baths used in wet spinning of cellulose triacetate into a spin bath comprising a chloroalkane such as methylene chloride, and a lower alkanol such as methanol. The spin bath may also contain water. Such a process is described in copending application Serial No. 48,643 filed August 10, 1960, which is herein incorporated and made a part of this application by reference. The spent spin bath comprising methylene chloride and methanol solution containing suspended fines of cellulose triacetate is subjected to the ion exchange process of this invention, to reduce the conductivity of the spin bath preferably to the range of from 0.3 to 1.0 micromho (measured at a temperature of 25° C.).

As the ion exchange resin, there may be employed an anion exchange resin or a cation exchange resin or both either in admixture or in succession, e.g. first and second resin beds. Preferably they operate on hydroxyl or hydrogen cycles, however, different ions have different effects on the spent spin bath and accordingly, even if the ion exchange resin operated on the sodium cycle it would result in a decrease in conductivity where the principal cations in the spent spin bath are calcium, iron, or the like. The exact amount of resin and the extent of treatment will of course depend upon the degree of diminution in conductivity which is desired. Advantageously strong acid or basic resins are preferred such as the cation exchange resin sold under the name Dowex 50 W–X8 by the Dow Chemical Company. Natural and/or inorganic ion exchange resins can also be employed. A partial list of suitable cation exchange resins includes sulfonated styrene-divinyl benzene copolymers, phenol-formaldehyde resins, phenol-formaldehyde-sulfite reaction products, sulfonated coal, and the like. A partial list of suitable anion exchange resins includes the reaction product of a tertiary amine with the chloromethylated copolymer of styrene and divinyl benzene, the reaction product of an alkylating agent such as methyl chloride or dimethyl sulfate with an amine-containing resin such as is obtained by reaction of formaldehyde, aniline and ethylene diamine, and the like.

The size and density of the resin particle will of course vary with the nature of liquid being deionized as well as the suspended particles. In the case of deionizing spin bath which contains cellulose triacetate fines in methylene chloride and methanol, the fines range in size from about $1\mu$ to about $75\mu$ in diameter and having a specific gravity of from 1.3 to 1.4 25°/4. For deionizing such a composition, it is preferable to use resin preferably ranging in particle size from about 0.01 inch to 0.05 inch and most preferably from about 0.02 to 0.03 inch in diameter and preferably having a specific gravity of from about 1.15 to 1.35.

Preferably at least 80% by weight of the fines and most preferably at least 99% of the fines remain in the liquid after the deionization step is completed.

As has been heretofore mentioned, it is not necessary for all the solid particles to be permitted to pass through the fluidized resin bed of this invention for advantageous results to be achieved. It will be understood that some solid particles will remain in the resin bed and will have to be periodically removed from the bed. However, the passage of solid particles through the resin bed is greatly increased by the process of this invention. For example, during deionization of the above mentioned spin bath for cellulose triacetate by the process of this invention, some solid particles do coat out on the ion exchange resin particles in the bed. Consequently it is advantageous to periodically treat the resin beds with a solvent for cellulose triacetate to remove this material. However, when using the ion exchange process of this invention, the resin bed may be used for several days before the resin bed need be treated with the solvent.

Apparatus for carrying out the process of this invention is diagrammatically shown in the accompanying drawing, in which chamber 10 has mounted therein lower screen 11 and upper screen 12 covering the entire cross-sections of chamber 10 respectively near the lower and upper ends thereof. The liquid containing the solid particles is fed into the chamber through conduit 13 at a velocity sufficient to fluidize ion exchange resin bed 14 comprised of resin particles 15 so that solid particles 16 may freely pass through the resin bed. It is preferable that the major portion of fluidized bed be maintained in the lower ⅔ of the space between the lower and upper screens. The liquid containing the solid particles passes through chamber 10, the lower and upper screens and leaves the chamber through conduit 17.

The following example will further illustrate the practice of this invention:

*Example*

Using the apparatus shown in the drawing, spent spin bath from a wet spinning of cellulose triacetate process is fed into chamber 10 through conduit 13. The spent spin bath comprises 36.7% methylene chloride, 62.5% methanol, 0.8% water and 0.0665% of suspended cellulose triacetate particles, said particles having a diameter of from $1\mu$ to $75\mu$ and a density of from 1.30 to 1.40. The spent spin bath has a conductivity of 0.99 micromho. The ion exchange resin bed comprises a loosely arranged mixture of particles of Dowex 50 W–X8 which is a strong cation exchange resin on the hydrogen cycle and particles of Dowex 21K, a strong anion exchange resin. The resin particles are 20 to 50 mesh in size and have specific gravities of about 1.15 for the anion exchange resin and about 1.35 for the cation exchange resin. The liquid which is withdrawn from chamber 10 through conduit 17 contains 0.0660% of suspended cellulose triacetate particles and has a conductivity of 0.42 micromho.

Dowex 50 W–X8 is made by the nuclear sulfonation of styrene divinyl benzene copolymer. Its standard cross-linkage in terms of percent divinyl benzene is 8%. It is supplied in the form of water swollen spheres (53% water content). In order to avoid contamination of the treated liquid, it is desirable to soak the resin in a liquid containing one or more of the major components of the liquid to be treated so as to replace the water. The Dowex 50 W–X8 resin used in the above examples was soaked in methanol prior to use in the process.

Dowex 21K is a strong basic anion exchange resin containing as the active group, the trimethyl benzyl ammonium group. It is supplied in the form of spheres (57% water content). Prior to use in the process of this invention, it is also desirable to replace the water contained in the resin as described above.

Where both anion and cation exchange resins are used as a mixture as described above, it is preferable that there be a difference in the terminal settling velocities of the particles of each resin. This will facilitate separation of the particles before the resins are regenerated. Where the particles of both ion exchange resins have the same size range, it is preferable that there be a difference in the specific gravities of the resin particles, preferably at least a 15% difference.

It is to be understood that the foregoing detailed description is given merely by way of illustration and that many variations may be made therein without departing from the spirit of our invention.

Having described our invention what we desire to secure by Letters Patent is:

1. A process for deionizing an organic liquid containing solid particles which comprises passing said liquid and said solid particles upwardly through a bed of ion exchange resin particles having a greater terminal settling velocity than said solid particles, at a velocity sufficient to maintain the resin bed in a constantly turbulent expanded fluidized state thereby permitting increased upward passage of said solid particles therethrough.

2. The process set forth in claim 1, wherein said velocity is such that the resin bed is sufficiently fluidized to permit the passage therethrough of a major portion of said solid particles.

3. The process set forth in claim 2, wherein at least 80% of said solid particles are permitted to pass through said resin bed.

4. A process for deionizing an organic liquid containing solid particles which comprises passing said liquid and said solid particles upwardly through a bed of ion exchange resin particles having a greater size and greater terminal settling velocity than said solid particles at a velocity sufficient to maintain the resin bed in a constantly turbulent expanded fluidized state thereby permitting increased upward passage of said solid particles therethrough and passing said liquid and solid particles upwardly through size screening means which prevent the passage of resin particles therethrough, the velocity of said liquid being less than that necessary to entrain such quantities of resin particles against said screening means such that the ion exchange bed becomes substantially non-fluidized.

5. The process in claim 4 wherein said upward velocity is sufficient to provide a fluidized resin bed having a volume of from 120 to 140% the volume of the bed at rest.

6. A process for deionizing an organic liquid containing solid particles which comprises passing said liquid and particles upwardly through lower size screening means, upper screening means and an ion exchange resin bed confined intermediate said lower and upper screening means, said ion exchange resin bed comprising resin particles of greater size than may pass through said lower and upper screening means and of greater terminal settling velocity than said solid particles, said liquid being passed at a velocity sufficient to fluidize the ion exchange resin bed to the extent that increased upward passage of said solid particles through said resin bed is permitted but a major portion of said fluidized bed is maintained in a constantly turbulent expanded state in the lower ⅔ of the space between the lower and upper screening means.

7. The process set forth in claim 1 wherein said liquid after passage through resin bed passes upwardly beyond said fluidized bed to a point substantially free of any entrained resin particles.

8. The process defined in claim 1 wherein said organic liquid is a spin bath withdrawn from a wet spinning of filaments process and said solid particles are suspended fines of filament forming polymer.

9. The process set forth in claim 6 wherein said organic liquid is a spin bath withdrawn from a wet spinning of filaments process and said solid particles are suspended fines of filament forming polymer.

10. The process set forth in claim 8 wherein said spin bath comprises a halogenated lower alkane and said fines are a cellulose ester.

11. The process set forth in claim 9 wherein said spin bath comprises methylene chloride and a lower alkanol and said fines are cellulose triacetate.

12. The process set forth in claim 11 wherein said ion exchange resin comprises anion exchange resin and cation exchange resin.

13. The process defined in claim 10 wherein said liquid and solid particles are passed through a second bed of ion exchange resin under conditions the same as those of the first bed, one of said beds comprising cation exchange resin and the other comprising anion exchange resin.

References Cited in the file of this patent

UNITED STATES PATENTS

| 1,410,712 | Nordell | Mar. 28, 1922 |
| 2,365,221 | Shafor | Dec. 19, 1944 |
| 2,765,913 | Weiss et al. | Oct. 9, 1956 |
| 2,861,038 | Steinmann et al. | Nov. 18, 1958 |
| 2,942,027 | Hewett et al. | June 21, 1960 |
| 3,071,807 | Laughlin et al. | Jan. 8, 1963 |

FOREIGN PATENTS

| 205,583 | Australia | Jan. 29, 1957 |